July 21, 1953 W. S. WATTS Re. 23,688

ELECTRICAL CONNECTOR

Original Filed Dec. 14, 1943

INVENTOR
WILLIAM S. WATTS.
BY
Blair, Curtis & Hayward
ATTORNEYS

Reissued July 21, 1953 Re. 23,688

UNITED STATES PATENT OFFICE 23,688

ELECTRICAL CONNECTOR

William S. Watts, Roselle, N. J., assignor to Aircraft Marine Products, Inc., Elizabeth, N. J., a corporation of New Jersey Original No. 2,410,321, dated October 29, 1946, Serial No. 514,216, December 14, 1943. Application for reissue October 28, 1947, Serial No. 782,469

7 Claims. (Cl. 339—213)

Matter enclosed in heavy brackets [ ] appears in the original patent but forms no part of this reissue specification; matter printed in italics indicates the additions made by reissue.

This invention relates to an electrical connector, and more particularly to a connector of the type which is adapted to be applied and secured to electrical conductors by crimping of a ferrule onto a conductor received therein.

Connectors of the general type of which this invention is concerned, have been in commercial use prior to my present invention and are disclosed, for example, in the application of Stephen S. Buchanan, Serial No. 421,408, filed December 3, 1941, issued as Patent No. 2,379,567 on July 3, 1945, and Serial No. 474,935, filed February 6, 1943; and in the application of Carlson and Freedom, Serial No. 459,624, filed September 25, 1942. In the terminals as illustrated in these prior copending applications a ferrule is formed of a size adapted to receive the bare conductor, e. g., the end of the stranded wire of an insulated cable, and over this is applied a metal sleeve extended beyond the open end of the ferrule so as to receive and support an insulated portion of the insulated cable. As commonly applied this extended sleeve has been crimped onto the insulation at the same time that the ferrule is crimped onto the bare portion of the conductor. This, for example, is disclosed and a suitable tool therefor is shown and described in an application of Vernon E. Carlson, Serial No. 455,033, filed August 17, 1942.

In many cases it is desirable that the exposed portions of the terminal of the ferrule should be non-conducting, either so as to avoid dangerous or disagreeable shock to persons making adjustments or repairs while the terminals are carrying relatively high voltages or to prevent accidental contact with nearby terminals or other conducting parts. Although it has been common practice prior to my invention, with other types of terminals, to provide insulated sleeves, it has not heretofore been considered feasible to use an insulated sleeve on a terminal which is to be crimped upon a wire. I have now discovered that, if an insulating sleeve is made of a tough stiffly flexible, more or less rubbery plastic of about the same order of thickness as the metal of the ferrule, e. g. from about a tenth up to about three or four times the thickness of the metal, depending upon the toughness and other properties of the plastic, the resulting insulated ferrule may be used in substantially the same manner and crimped with the same types of tools as those made entirely of metal, e. g., as described in the afore-mentioned copending application. Moreover, I have found that rubbery plastics of the type which may be subjected to severe deformation and which would recover only slowly after such deformation may be used with advantage, according to my invention; and thus, to the extent that such plastics may be damaged during the crimping operation, the damage is repaired by the gradual recovery of the plastic after its release from the crimping dies. This is of particular advantage when it is desired to mold or crimp the sleeve onto the insulation at the same time that the ferrule is crimped onto the wire. Plastic materials adapted to be thus formed onto the insulation tend to cut or extrude to some extent, from under the crimping die in the areas where the ferrule is crimped onto the wire, and thus may expose at certain points the conducting metal of the ferrule. The gradual recovery of the plastic will cause it to creep back over such exposed surfaces and thus give a satisfactory insulation of the entire ferrule.

In order to prevent a similar recovery of the portion of the sleeve which serves as the insulation support, the material of which it is made may be chosen with respect to the surface material of the wire so that the two adhere strongly when pressed together; or, if this is not convenient, a surface coating on the interior of the sleeve may serve as an adhesive for this purpose.

Although I am giving below and showing in the accompanying drawing, the preferred embodiments of my invention and suggesting various modifications thereof and alternatives, it should be understood that these are not intended to be exhaustive or limiting of the invention, but on the contrary, are given for purposes of illustration and explanation, in order that others skilled in the art may fully understand the invention, the principles thereof, and the manner of application for practical use, and may thereby be enabled to embody and adapt the invention in numerous forms and with numerous modifications, each as may be best adapted to the provisions of a particular use.

Figure 1:
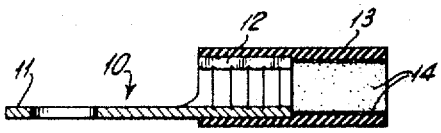
Figure 1 is a view in longitudinal section of a terminal embodying my invention, ready for application to an insulated wire.

As shown in Figure 1, a metal portion of the terminal 10 may be substantially identical with that described in the copending application mentioned above. For example, it may be made from sheet metal having a flat tongue portion 11 and a ferrule portion 12 made by rolling into cylindrical form, with the butting edges lateral extensions integral with the tongue portion 11. This metal portion can advantageously be made of dead soft annealed copper whereby it may be crimped onto the wire and coined by the crimping tool so as to form a substantially solid mass with the inserted wire and have a permanent union therewith, substantially without springback.

Over the ferrule 12 is the insulating sleeve 13 which tightly engages the ferrule. Depending upon the material used, this may be a press fit, or, advantageously, if as indicated above, the material is one which may be subjected to severe deformation and will tend to recover gradually its original size and form, the sleeve may be stretched to a larger diameter, fitted over the ferrule, and then allowed to shrink onto it. This subject matter is more particularly described and claimed in the copending application of Frank J. Sowa, Serial No. 560,785, filed October 28, 1944. This process can be facilitated by stretching at room temperature and warming the sleeve to a higher temperature to accelerate its recovery. Likewise, if it is desirable to hold a supply of the stretched ferrules for some time, they may be chilled to delay the recovery.

I have found an advantageous material for this purpose to be a vinyl chloride vinyl acetate copolymer, slightly plasticized with any of the usual plasticizers, e. g., tricresyl phosphate. Such material is commercially available in the form of extruded tubes [and may, for example, be obtained under the trade name "Irvilite" from the Irvington Varnish Works, Irvington, New Jersey.]

On the interior of the extended end of the sleeve 13, I have shown a coating of adhesive 14. This may be any known relatively stable adhesive compatible with the materials used for the sleeve 13 and the materials commonly used for surfacing insulated wire. I have found the pressure-sensitive adhesives, made from degraded rubber such as are commonly used in adhesive tapes, are satisfactory for this purpose.

In the use of this terminal the end of an insulated wire is first stripped to expose the central conductor of twisted stranded wire. This is then inserted in the end of the sleeve 13, the central stranded conductor extending on into the ferrule 12, while the insulation itself extends only into the sleeve 13 abutting against the ends of the ferrule. The assembly may then be crimped, in a tool such as that shown in the copending application of Veron E. Carlson above referred to; whereupon the ferrule 12 and the surrounding portions of the sleeve 13 are flattened and coined onto the wire, whereas the outer end of the sleeve 13 is crimped and formed so as tightly to embrace the insulation of the wire and to be cemented thereto by the adhesive 14. Whereas the sleeve 13 will tend to recover so as to repair any breaks which may possibly have occurred during the severe crimping of ferrule 12, the adhesive 14 tends to hold the outer portion of the sleeve in its pressed and deformed condition as shown, counteracting the tendency of the sleeve to recover its wider form.

Figure 2:
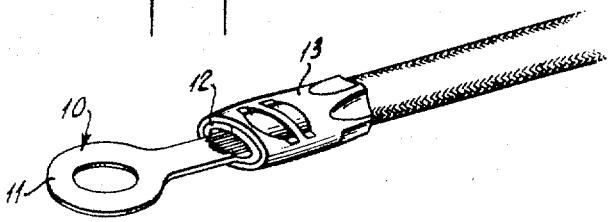
Figure 2 is a perspective view on a reduced scale, of the terminal as shown in Figure 1, applied and crimped onto a wire.
Figure 3:
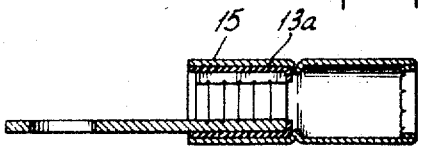
Figure 3 is a view in longitudinal section, similarly to that in Figure 1, showing another embodiment of my invention.

In Figure 3, I have shown an alternative structure, wherein instead of using a simple sleeve 13 of insulating material, a metal sleeve 15 is used of substantially the same form as that disclosed in the application of Freedom and Carlson above referred to. Between this and the ferrule 12, however, when the two are assembled, is inserted a layer of insulation 13a whereby the outer sleeve 15, although of conducting material, actually is not in conducting relation to the circuit. This terminal may be applied and crimped onto the wire in exactly the same manner as indicated in Figure 2. During the crimping operation, the outer sleeve 15 tends to relieve somewhat the severe strain imposed on the plastic insulating material and to oppose any tendency of the plastic to flow laterally out from under the crimping die.

Figure 4:
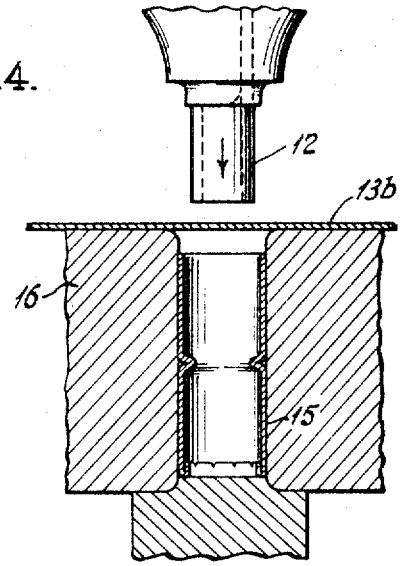
Figure 4 is a diagrammatic view in side elevation illustrating one method of making the terminal shown in Figure 3.

In Figure 4, I have shown diagrammatically one method of making the terminals of Figure 3. In this case a flat sheet of plastic 13b is placed over a drawing die 16 in which the sleeve 15 is fitted and suitably held. The ferrule 12 is then pressed down into the sleeve 15 (with or without preliminary drawing operations) to perform the sleeve 13a. The ferrule 12 carries with it the insulation 13a which is formed and drawn by the die 16 and pressed sufficiently to allow the two parts to enter together. If the sheet 13b is a Vinylite plastic such as is described above, the tendency of the material to recover gradually will be of advantage in that the stretched material will gradually draw farther into the space betwen the sleeve 15 and the ferrule 12 to the full extent permissible by the difference between their diameters. This can be hastened as indicated above, by warming the terminals after having been assembled at room temperature or even slightly chilled.

After the assembly operation and before or after this process of shrinking is complete, the end which is stretched over the end of the ferrule 12 may be punched out or this may be left in place and punctured when the stranded wire is inserted.

Although the terminal shown in Figure 3 has the advantage that in its finished appearance it is substantially identical with the terminals already in wide commercial use, the terminal of Figure 1 has the further advantage that the stiffly flexible plastic sleeve allows some yield with flexing of the insulated cable, so that sharp bending is avoided; and, due to its flexibility and its slow recovery, it also tends to damp vibrations in the wire and thus to protect the actual crimped connection in the ferrule from this destructive influence.

I claim:

1. An electrical connector of the type intended to be crimped onto a wire and including a soft metal ferrule and a normally rigid tube of tough and stiffly-flexible insulating plastic tightly embracing said ferrule and covering the outer surface thereof, said tube having a resistance to cold plastic flow not significantly less than that of the metal of said ferrule, whereby said tube can transmit sufficient crimping pressure to the ferrule from a crimping tool to crimp the ferrule against a conductor by plastic flow in the metal thereof without cracking the tube or otherwise interfering with its mechanical and electrical effectiveness.

2. An electrical connector as defined in claim 1 wherein the plastic of said tube is of the type having plastic memory, which tends gradually to recover its original form after severe deformation.

3. An electrical connector as defined in claim 1 wherein said tube extends substantially beyond the end of said ferrule whereby to receive and support an insulated portion of an insulated wire and has a coating of non-drying pressure-sensitive adhesive on the interior of said extended portion of the tube, whereby said extension may be secured to the insulated wire.

4. An electrical connector as defined in claim 1 wherein a thin metal sleeve surrounds said plastic tube.

5. *A connector for use in a crimped joint comprising a cylindrically shaped metal body portion having an open end for receiving a conductor therein, an insulating cover thereon, said insulating cover having the physical properties of permitting an indenting tool to be applied externally to the insulation and causing the metal body underneath to be indented in the form of a recess to a conductor therein, and of substantially retaining the shape of the recess in the insulation after the tool has been withdrawn.*

6. *A connector for use in a crimped joint comprising a cylindrically shaped metal body portion having an open end for receiving a conductor therein, an insulating cover thereon, said insulating cover having the physical properties of toughness, flexibility and plasticity, whereby to transmit from an externally applied indenting tool to said metal body portion beneath it a localized force, sufficient to indent said body onto a conductor within said body in an area beneath*

*said indenting tool, and of substantially retaining the shape of the recess produced by such indenting tool after the tool has been withdrawn.*

7. *A connector for use in a crimped joint comprising a cylindrically shaped metal body portion having an open end for receiving a conductor therein; an insulating cover thereon, said insulating cover having the physical properties of permitting an indenting tool to be applied externally to the insulation and causing the metal body underneath to be indented in the form of a recess to a conductor therein and of initially retaining the approximate shape of the recess in the insulation after the tool has been withdrawn but having a tendency to return, at least to some extent, to the shape it had prior to indenting.*

WILLIAM S. WATTS.

References Cited in the file of this patent or the original patent

UNITED STATES PATENTS

| Number | Name | Date |
|---|---|---|
| 2,035,911 | Mucher | Mar. 31, 1936 |
| 2,148,392 | Ransome | Feb. 21, 1939 |
| 2,173,668 | Smith | Sept. 10, 1939 |
| 2,297,336 | White | Sept. 29, 1942 |
| 2,338,524 | McCabe | Jan. 4, 1944 |

FOREIGN PATENTS

| Number | Country | Date |
|---|---|---|
| 847,814 | France | July 10, 1939 |